# (12) United States Patent
Chibwana et al.

(10) Patent No.: US 12,492,449 B2
(45) Date of Patent: Dec. 9, 2025

(54) OXIDATIVE BIOLEACHING OF BASE METALS

(71) Applicant: BHP CHILE INC., Santiago (CL)

(72) Inventors: Clement Chilowa Chibwana, Concepcion (CL); Cristian E. Mundaca, Santiago (CL)

(73) Assignee: BHP CHILE INC., Santiago (CL)

( * ) Notice: Subject to any disclaimer, the term of this patent is extended or adjusted under 35 U.S.C. 154(b) by 448 days.

(21) Appl. No.: 17/906,534

(22) PCT Filed: Mar. 18, 2021

(86) PCT No.: PCT/IB2021/052259
§ 371 (c)(1),
(2) Date: Sep. 16, 2022

(87) PCT Pub. No.: WO2021/186376
PCT Pub. Date: Sep. 23, 2021

(65) Prior Publication Data
US 2023/0407435 A1    Dec. 21, 2023

(30) Foreign Application Priority Data

Mar. 18, 2020 (ZA) ................................ 2020/01692

(51) Int. Cl.
| | |
|---|---|
| C22B 15/00 | (2006.01) |
| C22B 1/14 | (2006.01) |
| C22B 3/08 | (2006.01) |
| C22B 3/18 | (2006.01) |

(52) U.S. Cl.
CPC ............ C22B 15/0071 (2013.01); C22B 1/14 (2013.01); C22B 3/08 (2013.01); C22B 3/18 (2013.01); C22B 15/0089 (2013.01)

(58) Field of Classification Search
CPC ......... C22B 15/0071; C22B 1/14; C22B 3/08; C22B 3/18; C22B 15/0089; C22B 3/44; C22B 1/00; Y02P 10/20
USPC ..................................................... 75/744, 743
See application file for complete search history.

(56) References Cited

U.S. PATENT DOCUMENTS

| | | | |
|---|---|---|---|
| 2004/0091984 A1* | 5/2004 | Hunter ...................... | C22B 3/18 |
| | | | 435/168 |
| 2016/0258036 A1* | 9/2016 | Rautenbach .............. | C22B 3/08 |

FOREIGN PATENT DOCUMENTS

| | | | | |
|---|---|---|---|---|
| WO | WO-0131072 A1 * | 5/2001 | ......... | C22B 15/0063 |

OTHER PUBLICATIONS

Hernandez et al., "Accelerating Copper Leaching from Sulfide Ores in Acid-Nitrate-Chloride Media Using agglomeration and Curing as Pretreatment", Minerals, vol. 9, No. 4, Apr. 25, 2019 (Year: 2019).*

(Continued)

*Primary Examiner* — Danielle M. Carda
(74) *Attorney, Agent, or Firm* — Crowell & Moring LLP (57) ABSTRACT

An oxidative bioleaching process for leaching a base metal from an ore that includes an ore agglomeration step, an ore stacking step wherein agglomerated ore is stacked to form a heap, a curing step, a rinse step, an inoculation step and a leach step, and wherein, during the ore agglomeration step, the ore is contacted with an acid solution containing nitrate or nitrite thereby to accelerate the leaching rate in the leach step.

20 Claims, 3 Drawing Sheets

(56) References Cited

OTHER PUBLICATIONS

International Search Report and Written Opinion of the International Search Authority mailed Jun. 23, 2021 in International Application No. PCT/IB2021/052259 (English language) (9 pp.).
International Preliminary Report on Patentability dated Oct. 8, 2021 in International Application No. PCT/IB2021/052259 (English language) (41 pp.).
Hernandez et al., "Accelerating Copper Leaching from Sulfide Ores in Acid-Nitrate-Chloride Media Using Agglomeration and Curing as Pretreatment," Minerals, vol. 9, No. 4, Apr. 25, 2019 (13 pages).
Watling, Helen R., Review of Biohydrometallurgical Metals Extraction from Polymetallic Mineral Resources, Minerals, vol. 5, No. 1, Dec. 24, 2014 (60 pages).

* cited by examiner

OXIDATIVE BIOLEACHING OF BASE METALS

This application is a National Stage Application of International Application No. PCT/IB2021/052259, filed Mar. 18, 2021, wherein the above-referenced International Application claims under 35 U.S.C. § 119(a) the benefit of the filing date of South African Application No. 2020/01692, the entire contents of each of which are incorporated herein by reference.

BACKGROUND

This invention relates to a process of leaching base metals from a heap of ore.

The oxidative action of nitrate and nitrite in aqueous solutions of sulfuric acid is extensively described in the literature and patent prior art.

Anderson (2003) states that the addition or presence of $NO_2^-$ instead of $NO_3^-$ enhances reaction rates of chalcopyrite oxidation. The nitrate/nitrite ions act as direct oxygen atom donors, rather than as electron acceptors. Results presented by Gok and Anderson (2013) demonstrate that effective leaching of chalcopyrite is achieved by leaching a fine milled mineral ($d_{80}$ 15 microns) with 0.1M $NaNO_2$, 1M $H_2SO_4$, and at a temperature of over 100° C. (110-120° C.). Copper recovery at 80° C. was 70% after 6 h compared to a recovery of 96% after 2 h at 120° C. It was found that the use of sodium nitrite, under these extreme conditions, was more effective than sodium nitrate.

Sokić et al (2009) describe the kinetics of chalcopyrite leaching in a sulfuric acid solution using sodium nitrate as the oxidant. The results indicate the importance of temperature and the requirement of fine milling of the ore (recoveries of >40% required a particle size of minus 37 microns) in order to achieve satisfactory copper dissolution. The dissolution of copper increased with increasing sulfuric acid and sodium nitrate concentrations and decreasing particle size.

Baldwin and Van Weert (1996) compare the rate of oxidation of ferrous to ferric in the presence and absence of nitrates or nitrites. The rate of Fe(II) oxidation was increased by the addition of nitric acid and nitrate and was significantly increased by the addition of nitrite. Thus, adoption of nitrite-assisted oxidation in autoclaves used for mineral processing could result in more efficient operations.

Ricardo Andres Soto Mellado (Ibáñez & Mellado, 2018) provide a description of a process of copper sulfide mineral oxidation and leaching in acid chloride and sulfuric acid chloride/nitrate solutions. The publication discloses details for the treatment of a low grade copper sulfide ore in an acid chloride-nitrate medium. The concept of pre-treating ore in an agglomeration and curing step is disclosed. Mechanisms for chalcopyrite leaching in acid ferric sulfate and acid sulfuric acid chloride solutions, and the action of adding nitrate (as sodium nitrate or ferric nitrate) to increase the solution oxidation potential are disclosed. Metal dissolution of 27% on a milled sample at 25% solid content on a specific low grade ore (0.12% Cu) was achieved. Ibáñez & Mellado concluded that despite increased mineral degradation, the addition of sodium nitrate and ferric nitrate in conjunction with sodium chloride and sulfuric acid during the pretreatment of a copper sulfide mineral does not significantly affect the final copper dissolution.

U.S. Pat. No. 9,683,277 discloses an application of nitrate assisted leaching using ferric nitrate. The action of ferric nitrate and the method of generation of this reagent are disclosed.

WO 2012/162851 A1 describes a method of generating ferric nitrate in a copper ore in a hydrometallurgical process.

CL 43295 discloses a method for extracting copper or other metals from sulfide ores, the method including the following steps: crushing the ore to minus 6 mm; treating the ore with concentrated sulfuric acid in an agglomeration step; stacking the agglomerated ore in a heap; irrigating the heap with a dilute aqueous solution consisting of sulfuric acid and sodium nitrate ($NaNO_3$); collecting a leaching product and recovering copper metal from the leaching product by electrolysis.

WO 2017/063099 describes a method of leaching a mineral with the addition of nitrate to a chloride/sulfuric acid solution thereby achieving high oxidation potentials in solution. The use of a novel reactive mixture in the steps of leaching and chemical curing is described. This reactive mixture is produced from the combination of nitrate ions, from ammonium nitrate ($NH_4NO_3$), iron ions (Fe), derived from a refining solution formed during a solvent extraction step, the addition of ferrous sulfate and, if required, sulfuric acid and chlorine salts. The reactive mixture has a redox potential of between 800 and 1200 mV vs. SHE.

In the bioleaching of a chalcopyrite concentrate, nitrate was used to increase the redox potential in order to improve the copper dissolution from the ore, Shier et al (2014). The results showed that copper dissolution increased by 20% in agitated tanks where they added nitrate and that although the archaea microbes did not adapt to the presence of nitrate, the bacteria adapted to nitrate presence in growth media. The research also concluded that nitrate may be essential to high-temperature oxidation of chalcopyrite through redox control.

WO2012/162851, WO 2017/063099, U.S. Pat. No. 9,683,277, and CL 43295 each disclose a method of heap leaching in which either ferric nitrate, ammonium nitrate or sodium nitrate acts as an oxidising agent, in a sulfuric acid or sulfuric acid/chloride aqueous solution.

U.S. Pat. No. 5,096,486 describes a sulfuric acid leach process using sodium nitrite to treat sulfide materials (including copper sulfides) by leaching under relatively mild oxygen pressure and temperature conditions.

U.S. Pat. No. 3,888,748 describes a leaching process using nitric and sulfuric acid at temperatures of at least 50° C., demonstrating the oxidation advantage of adding nitric acid (or nitrate) in a sulfuric acid leach.

Hernández Pía C. et al: "Accelerating Copper Leaching from Sulphide Ores in Acid-Nitrate-Chloride Media Using Agglomeration and Curing as Pretreatment". MINERALS, vol 9, no. 4, 25 Apr. 2019 (2019-04-25), page 250, XP055812591 DOI: 10.3390/min9040250 investigates the effect of an agglomeration and curing pretreatment on leaching of a copper sulphide ore, mainly chalcopyrite, using mini-columns in acid-nitrate-chloride media. A bioleaching step is not disclosed.

WO 01/31072 A1 discloses a method of operating a bioleach process for the leaching of a sulphide bearing ore or concentrate including the step of subjecting a bioleach slurry which includes dissolved oxygen, dissolved carbon dioxide, sulphide and microorganisms to a bioleach stage, and controlling the redox potential of the bioleach slurry within a predetermined range. The use of nitrate is not disclosed.

Watling Helen: "Review of Biohydrometallurgical Metals Extraction from Polymetallic Mineral Resources: MINERALS, vol. 5, no. 1, 24 Dec. 2014 (2014-12-24), pages 1-60, XP055775297, DOI: 10.3390/min501001 discusses the challenges to microbial growth in the bioleaching of polymetallic mineral resources and the inhibiting impact that nitrate ions have on microorganisms inhabiting the heap.

It is an aim of the current invention to provide an oxidative bioheap leaching process, to recover base metals from a sulphide mineral, wherein a nitrogen compound is used as an oxidant.

It is a further aim to provide a bioheap leaching process using a nitrogen compound as an oxidant wherein the inoculation and bioleaching steps are not adversely affected due to the inhibiting effect of nitrate or nitrite compounds on microbial growth.

SUMMARY OF INVENTION

The invention described herein is based on the discovery that the bioleaching of base metal ores, particularly copper and nickel sulfide and oxide ores, is enhanced by treating the ore in a highly oxidising environment during a pre-treatment phase of ore agglomeration and curing. The highly oxidising environment is created by contacting the ore with an acidic sulfate solution containing optimised quantities of nitrate or nitrite to increase the rate of oxidation of sulfide minerals and to generate heat thereby accelerating the leaching rate in a subsequent bioleach step.

"Heap" as used herein includes treating ore in an irrigated heap, in a column, in a large vat (dome, container) or in a large ore dump.

As used herein, a "copper heap leach circuit" refers to at least one heap, and more typically multiple heaps, constructed on a lined pad that facilitates heap drainage to a collective solution system that consists of at least one pond connected through piping to a solvent extraction and electrowinning process to recover copper from the heap drainage (commonly referred to as a "pregnant leach solution" (PLS)). The lower copper and higher acid solution from the solvent extraction process, commonly referred to as "raffinate", is, in turn, or at least partly, used for heap irrigation.

As used herein, a "dynamic copper heap leach circuit" refers to a copper heap leach circuit, but includes the process of removing leached residue material from the circuit after the heap cycle is completed, commonly referred to as "reclaiming". The reclaimed ore is typically disposed of to a residue dump.

A "permanent copper heap leach circuit" refers to a copper heap leach circuit, but uses a single leach pad area for the heap leach process, and, on completion of the first and subsequent heap leach cycles, old heaps containing leached residue ore remain in place and new heaps are constructed on top of the old heaps.

"Solution potentials" are mV versus standard hydrogen electrode (SHE)

The invention provides an oxidative bioleaching process for leaching a base metal from an ore that includes an ore agglomeration step, an ore stacking step wherein agglomerated ore is stacked to form a heap, a curing step, a rinse step, an inoculation step and a leach step, and wherein, during the ore agglomeration step, the ore is contacted with an acid solution containing nitrate or nitrite thereby to accelerate the leaching rate in the leach step.

During the agglomeration step, the oxidation potential of the solution in contact with the ore is in the range of >750 mV<1250 mV versus SHE (standard hydrogen electrode).

The process is performed at ambient temperature, and at atmospheric pressure.

Prior to the agglomeration step, the ore may be crushed to a desired particle crush size. The distribution of the crush size is determined by the ore characteristics and may be in the range of a P80 of 6 mm to a P80 of 50 mm.

The nitrate or nitrite may be added in a solution or may be added as a solid salt to the ore in the agglomeration step, to meet the total desired dosage.

The nitrate or nitrite addition is in the range of 1-50 kg nitrate or nitrite salt/ton of ore treated, preferably 1-10 kg/ton of ore treated.

The source of nitrate may be $NaNO_3$, $KNO_3$, $HNO_3$ or any other soluble inorganic nitrate salt.

The source of nitrite may be $NaNO_2$, $KNO_2$, $HNO_2$ or any other soluble inorganic nitrite salt.

The solution in contact with the ore in the ore agglomeration step is acidic with a pH lower than pH3. Typically, the acid concentration in solution is in the range 2-250 g/L.

Concentrated acid may be added to the ore during the agglomeration step, as required, to supplement the acid in the solution, in the range of 1-100 kg/t of ore treated.

The contact solution contains iron, copper and other dissolved cations and anions as leach product species.

Recycled process solution containing nitrate or nitrite may be used in the ore agglomeration step.

Raffinate solution from solvent extraction operations or process solutions obtained from any part of the leach circuit may be used in the ore agglomeration step.

The moisture content of the agglomerated ore may be in a range of 3-20%. It is important to ensure that the agglomerated ore contains sufficient moisture so that it does not dry during the curing step to allow mineral oxidation reactions to continue.

Gases ($NO_x$) produced in the ore agglomeration step are recovered by passing the gases through process raffinate solution in a gas scrubbing step.

Nitric oxide gas (NO) has a much lower solubility in the aqueous raffinate solution used compared to $NO_2$. NO gas is therefore oxidised to $NO_2$ by mixing air, or oxygen enriched air with the $NO_x$ in the gas scrubbing step. The resulting scrubber raffinate solution from the gas scrubbing step is recycled to the ore agglomeration step or to a heap rinse step.

Government regulations are strict on the release of the above gasses into the environment (because they can contribute to the formation of smog, acid rain and affect the ozone layer); as such only optimum additions of reactants are recommended in order to minimise their generations.

It is recommended that adequate Personal Protective Equipment (PPE) should be worn by the operators to avoid excessive exposure and health risks.

The agglomerated ore is transferred and stacked in a heap (or equivalent column, vat or dump), in a dynamic or permanent heap leach circuit.

The stacked ore is then subjected to a curing step for a period of 2-50 days, preferably 5-20 days. The duration of the curing step depends on ore composition and the acid and nitrate or nitrite concentrations of reactants contained in the contact solution. Shorter cure times are expected for oxide ores while longer cure times are expected for primary or chalcopyrite ores.

The curing step may be carried out without aeration.

Alternatively, the curing step is carried out with aeration at a determined rate in the range 0-0.05 $Nm^3/hr \cdot t$, preferably 0-0.02 $Nm^3/hr \cdot t$ of ore treated.

During the curing step, oxidation of sulfide minerals will generate heat thereby raising the temperature of the heap. The rise in temperature accelerates the rate of leaching in the subsequent leach step.

The curing step is followed by a rinse step to displace residual acid and nitrate or nitrite salts in solution, and to recover copper leached in the cure step. A resulting high nitrate or nitrite pregnant leach solution (PLS) is transferred to a high nitrate or nitrite PLS pond. The rinse step may be carried out with or without aeration. Alternatively the rinse step is carried out with aeration in the range of 0-0.05 $Nm^3/hr \cdot t$ of ore treated.

Nitrate and nitrite compounds have a severe inhibitory effect on microbial growth. Thus, preferably, the oxidative process using a nitrogen compound is carried out in separate ore agglomeration and curing steps prior to the heap inoculation and bioleaching steps, overcoming microbial inhibition in the inoculation and bioleaching steps due to the inhibiting effect of nitrate or nitrite compounds on microbial growth.

The copper contained in the high nitrate or nitrite PLS is recovered in a solvent extraction step (SX).

The presence of nitrate or nitrite salts in a copper PLS has a detrimental effect on the operation of the solvent extraction (SX) plant as it degenerates the extractants used through nitrification. It is necessary to use suitable proprietary SX reagents and extractant modifiers to prevent excessive reagent degradation.

The rinse step is followed by the inoculation step.

During the inoculation step, a microbial inoculum of adapted microbial strains is added in an acidic irrigation solution to inoculate the heap via irrigation of the top surface of the heap. The strains included in the inoculation solution are chosen from autotrophic thermotolerant microbial strains operating in the following specific temperature ranges, from 15-25° C., 25-40° C., 40-48° C., 48-55° C., 55-65° C. and 65-80° C.

The microbial strains may be of the kind referred to in "HIGH TEMPERATURE HEAP LEACHING OF CHALCOPYRITE: METHOD OF EVALUATION AND PROCESS MODEL VALIDATION; D. W. Dew, G. F. Rautenbach, I. J. Harvey, J. S. Truelove, and R. P. van Hille; Conference Proceedings; The Southern African Institute of Mining and Metallurgy, Percolation Leaching: The status globally and in Southern Africa 2011" as set out in the table below. This is however by way of example only and is not limiting.

| | Optimum Growth pH | pH Operating Range | Optimum Temperature (° C.) | Temperature Growth Range (° C.) |
|---|---|---|---|---|
| BACTERIA | | | | |
| Acidithiobacillus ferrooxidans | 1.7-2.5 | 1.3-4.5 | 30-35 | 10-37 |
| Acidithiobacillus thiooxidans | 2.0-3.0 | 0.5-5.5 | 28-30 | 10-37 |
| Leptospirillum ferrooxidans | 1.6-2.1 | 1.5-4.0 | 30 | 20-35 |
| Leptospirillum ferriphilum | 1.4-2.1 | 1.4-4.0 | 37 | 30-45 |
| Sulfobacillus disulfidooxidans SG1 | 1.5-2.5 | 0.5-5.0 | 35 | 4-40 |
| Acidithiobacillus caldus | 2.0-2.5 | 1.0-3.5 | 45 | 32-52 |
| Acidithiomicrobium SAR | 1.7-2.5 | 1.0-3.5 | 50 | 40-55 |
| Acidimicrobium ferrooxidans | 1.7-2.5 | 1.0-3.5 | 50 | 40-55 |
| Sulfobacillus thermosulfidooxidans | 1.7-2.4 | 1.0-3.0 | 50 | 28-60 |
| Sulfobacillus MAD | 2.0-3.0 | 1.0-4.0 | 50 | 38-55 |
| ARCHAEA | | | | |
| Ferroplasma acidiphilum | 1.7 | 1.3-2.2 | 37 | 15-45 |
| Sulfolobus metallicus | 1.7-2.0 | 1.0-5.5 | 70 | 65-78 |
| Metallosphaera sedula | 2.0 | 1.0-4.5 | 75 | 50-80 |
| Metallosphaera hakonensis | | Closely related to Metallosphaera sedula | | |

On completion of the inoculation step, the leach step begins by irrigating the heap with a recycled low nitrate or nitrite raffinate solution. The low nitrate or nitrite raffinate solution used to irrigate the heap is applied to a top of the heap using any desired method that may include spraying, dripping or a combination of spraying and dripping. The solution application rate can be continuous, or intermittent with specific periods of rest of 4 to 24 hours between periods of solution application.

The heap is aerated during the inoculation step and leach step at a rate in the range of 0-0.05 $Nm^3/hr \cdot t$ of ore treated to facilitate biooxidation of the sulfide minerals. If required, to maintain microbial growth during the inoculation step and leach step, carbon dioxide may be added to air to give a concentration of carbon dioxide of 1%-2% by volume in air.

The leach step is continued until the target metal recovery is achieved, typically, but not limited to, from 50% to 90% of contained metal in the ore.

The inoculation step may be repeated during the leach step to increase microbial activity during the bioleach process of the leach step, if required.

High nitrate or nitrite raffinate from the solvent extraction step is recycled for use in ore agglomeration step or in the heap rinse step. A low nitrate or nitrite raffinate from the solvent extraction step is recycled for use in the leach step. In this method of operation, the nitrate or nitrite compounds used in the oxidative process in the ore agglomeration step and the curing step are separated from the subsequent inoculation and bioleaching steps. This separation ensures that microbial activity during the inoculation and leach steps is not inhibited by high nitrate or nitrite concentrations during the inoculation and bioleaching steps.

The low nitrate or nitrite raffinate solution used to irrigate the ore in the leach step may have an acid concentration of 2-20 g/L to maintain a pH of the solution below pH3.

The low nitrate or nitrite raffinate solution may have a nitrate or nitrite concentration of 0-5 g/L, preferably 0-2 g/L and more preferably 0-1 g/L.

The concentration of nitrate or nitrite in the high nitrate or nitrite raffinate depends on the addition rate of nitrate or nitrite in ore agglomeration and the consumption rate of nitrite or nitrate in the cure step. The high nitrate or nitrite raffinate solution used in the ore agglomeration step and rinse step may have a nitrate or nitrite concentration of 0.5-80 g/L, preferably 0.5-30 g/L and more preferably 0.5-10 g/L.

The method of ore agglomeration and curing increases the oxidation potential of the solution in contact with the ore to >750 mV<1250 mV. This in turn increases heap temperatures as a result of the pyrite and copper sulfide mineral oxidation thereby increasing the rate of copper sulfide mineral dissolution and oxidation of pyrite compared to conventional bioleaching with no cure step in the presence of nitrate or nitrite salts.

Heat is transferred up the heap of agglomerated ore by moist air blown in at the base of the heap and is lost in warm moist air leaving the heap. Heat is transferred down the heap by the irrigation solution and is lost from the heap in the drainage solution. The heap temperature is maintained at a maximum by controlling the rate of aeration and rate of solution irrigation, thereby reducing the rate of heat loss from the heap.

The invention ensures that a high oxidising environment within the heap is created by the oxidative action of nitrate or nitrite and, as such, sulfide minerals are oxidised with or without the supply of air (oxygen) to the process.

The high oxidising environment created within the heap is also favourable to the exothermic oxidation of pyrite regardless of the sulfate concentration in the leach solution. In bioleaching, the rate of pyrite oxidation is limited in leach solutions with high sulfate concentrations, above 80 g/L sulfate. Lower rates of pyrite oxidation consequently lower the heat generation rate in the heap.

BRIEF DESCRIPTION OF THE DRAWINGS

The invention is further described by way of example with reference to the accompanying drawings wherein.

DESCRIPTION OF PREFERRED EMBODIMENT

Figure 1:
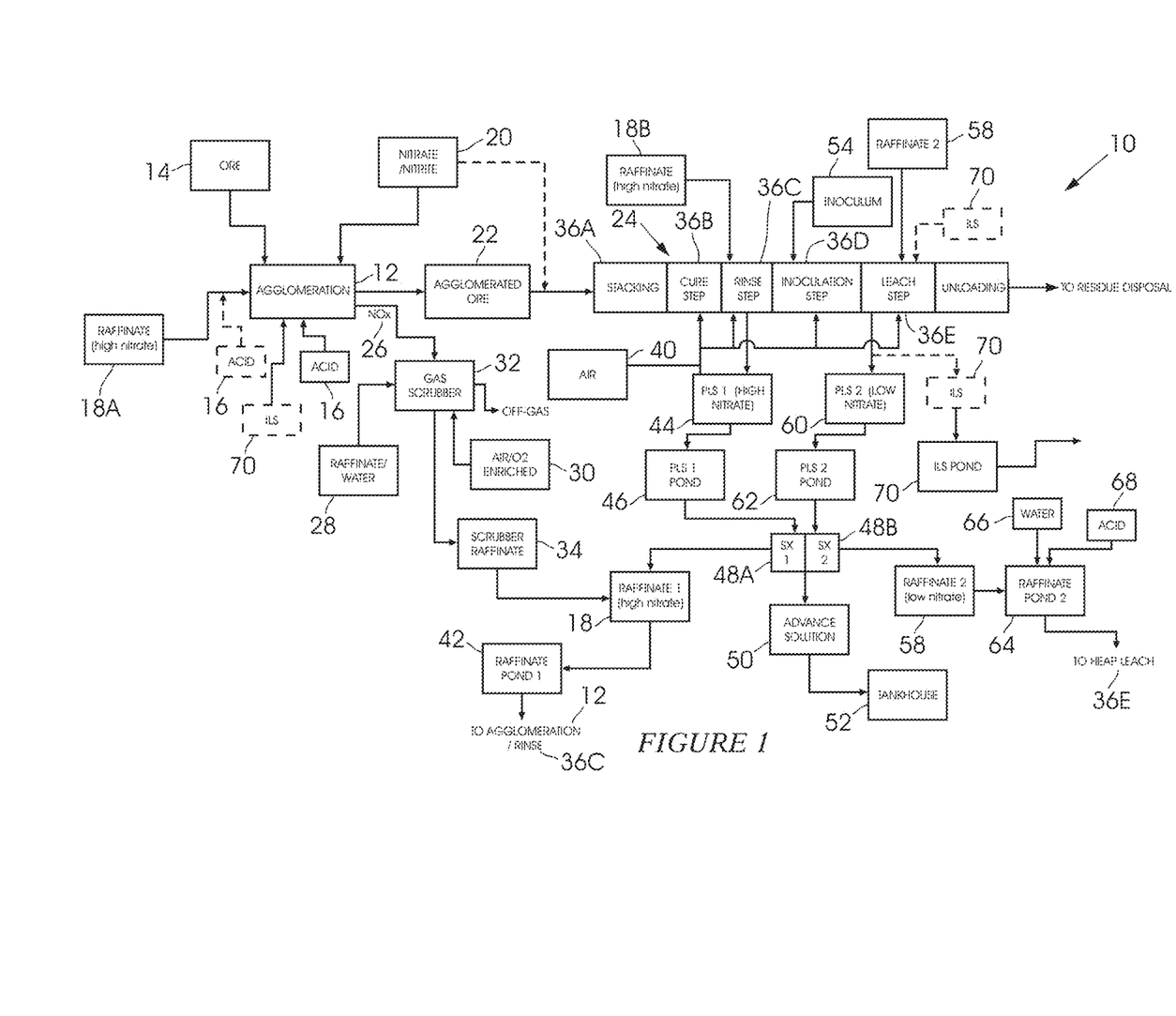
FIG. 1 is a flow diagram of a method according to the invention.

FIG. 1 shows a simplified and generalised dynamic copper heap leaching circuit 10 which can be used for the leaching of primary sulfides, secondary sulfides, oxides and mixed copper ores.

The dynamic copper heap leach is not limiting and the invention applies to any chosen method of leaching agglomerated ore in a heap, which may be a permanent copper heap leach circuit.

An ore pre-treatment agglomeration step 12 is conducted in an agglomeration drum where an ore 14 is contacted with sulfuric acid 16, a high nitrate or nitrite raffinate solution 18A and nitrate/nitrite 20 to form an agglomerated ore 22.

The high nitrate or nitrite raffinate solution 18A has a low chloride concentration as higher chloride levels are detrimental to a microbial inoculum 54 used in a subsequent inoculation step 36D and chloride concentrations of zero, or 0-10 g/L, are required.

Nitrate or nitrite 20 is added in the agglomeration step in the range of 1-50 kg/t of ore, preferably 1-10 kg/t of ore treated.

The nitrate or nitrite 20 can be added as a solution or as a solid, to the ore 14 in the agglomeration step 12, before the ore 14 is added in the agglomeration step 12, or after the ore agglomeration step 12 and before the agglomerated ore 22 is stacked in a heap 24.

The oxidation reaction of the nitrate or nitrite 20, sulfuric acid 16 and the high nitrate or nitrite raffinate solution 18A with the ore 14 is exothermic and thus increases the temperature of the agglomerated ore 22 once it is stacked in the heap 24. Oxidation of 14.5 kg/t of pyrite (1.4% pyrite content in the ore) generates 21 watts per ton of ore and will increase heap temperatures above ambient by 10-30° C., depending on heat losses by convection and radiation from the heap surfaces, and heat loss from moist air leaving from the top of the heap and drainage solution leaving from the bottom of the heap.

In a standard operation, the contact leach solution (high nitrate or nitrite raffinate 18A) contains a copper concentration of 0.5 g/L, Fe(T) of 2 g/L with other dissolved species from the circuit. These concentrations are not limiting and depend on the plant conditions and composition of the ore being treated.

During agglomeration 12, nitrogen oxide ($NO_x$) 26 may be produced and therefore the ore agglomeration step 12 includes provision for the capture of evolved acid fumes of the volatile oxide gases of nitrogen through scrubbing. The NOx gasses 26 are contacted with raffinate or process water 28 with air or oxygen enriched air 30 in a gas scrubbing step 32 to form a scrubber raffinate solution 34. The NO gas evolved is oxidised to $NO_2$ gas. The $NO_2$ gas produced is highly soluble in the raffinate solution or process water 28 used in the gas scrubbing step 32.

The scrubber raffinate solution 32 is combined with a high nitrate raffinate from a subsequent rinse step 36C to produce a high nitrate or nitrite raffinate 18 which is then recycled to the agglomeration step 12 as the high nitrate or nitrite raffinate solution 18A, or to the heap 24, as high nitrate or nitrite raffinate 18B, to be used in the rinse step 36C. The recycling of high nitrate raffinate solution 18A for ore agglomeration decreases the consumption of nitrate and nitrite salts.

It is necessary that adequate Personal Protective Equipment (PPE) should be worn by the operators to avoid excessive exposure and health risks.

During agglomeration 12 the reactants are mixed with the ore 14 and the moisture content of the agglomerated ore 22 is in the range of 3-20% moisture, preferably 6-12% moisture.

The agglomerated ore 22 is transferred and stacked 36A to form a heap 24. The stacked ore 36A is allowed to cure in a curing step 36B for 2-50 days, preferably 5-20 days, or more preferably 2-10 days. During the curing step 36B, forced aeration 40 is applied from the bottom of the heap 24 at the rate of 0-0.04 $Nm^3/hr \cdot t$.

In a further embodiment the curing step 36B is carried out without aeration.

Once curing is completed, a high nitrate or nitrite raffinate solution 18B from a high nitrate raffinate pond 42 is applied on top of the heap 24 in the rinse step 36C. An irrigation volume of high nitrate or nitrite raffinate solution 18B within the range 0.1-2 $m^3$ per ton of ore is applied in the rinse step 36C. The high nitrate or nitrite raffinate solution 18B displaces residual nitrate, or nitrite salts, and copper leached in the cure step 36B. A resulting high nitrate or nitrite drainage solution, in the form of a pregnant leach solution 1 (PLS1) 44, from the rinse step 36C, is collected in PLS 1 pond 46. The PLS1 44 is high in copper, nitrate or nitrite salts and other cationic and anionic species from the leached ore. The PLS 1 pond 46 feeds a solvent extraction (SX1), plant 48A where copper is concentrated to produce an advance electrolyte solution 50 which is treated to recover copper by means of electrowinning in the electrowinning tankhouse 52. The copper stripped PLS1 44 constitutes a high nitrate or nitrite raffinate solution and is mixed with the saturated scrubber raffinate 34 to produce a high nitrate or nitrite raffinate 18 which is then collected in the high nitrate or nitrite raffinate pond 42. The high nitrate or nitrite raffinate solution 18 is recycled to the ore agglomeration step 12 as a high nitrate or nitrite raffinate solution 18A, and to the rinse step 36C as a high nitrate or nitrite raffinate solution 18B.

During the rinse step 36C, forced aeration 40 is applied from the bottom of the heap 24 at the rate of 0-0.05 $Nm^3/hr \cdot t$.

In a further embodiment the rinse step 36C is carried out without aeration.

Following the rinse step 36C to displace leached copper and recover excess residual nitrate or nitrite salts in the heap 24 an inoculation solution 54 is applied to the heap 24 in an inoculation step 36D. Inoculation is necessary in order to achieve a microbial cell population in the heap in the range of $1 \times 10^9$ to $5 \times 10^{11}$ cells/t of ore.

During the inoculation step 36D, forced aeration 40 is applied from the bottom of the heap 24 at the rate of 0-0.05 $Nm^3/hr \cdot t$.

By way of example, the microbial strains that can be used in the inoculation step are shown in the following table listed broadly into temperature ranges and whether bacteria or archaea, the latter dominant at temperatures above 60° C.; reference: "HIGH TEMPERATURE HEAP LEACHING OF CHALCOPYRITE: METHOD OF EVALUATION AND PROCESS MODEL VALIDATION; D. W. Dew, G. F. Rautenbach, I. J. Harvey, J. S. Truelove, and R. P. van Hille; Conference Proceedings; The Southern African Institute of Mining and Metallurgy, Percolation Leaching: The status globally and in Southern Africa 2011".

|  | Optimum Growth pH | pH Operating Range | Optimum Temperature (° C.) | Temperature Growth Range (° C.) |
|---|---|---|---|---|
| BACTERIA |  |  |  |  |
| Acidithiobacillus ferrooxidans | 1.7-2.5 | 1.3-4.5 | 30-35 | 10-37 |
| Acidithiobacillus thiooxidans | 2.0-3.0 | 0.5-5.5 | 28-30 | 10-37 |
| Leptospirillum ferrooxidans | 1.6-2.1 | 1.5-4.0 | 30 | 20-35 |
| Leptospirillum ferriphilum | 1.4-2.1 | 1.4-4.0 | 37 | 30-45 |
| Sulfobacillus disulfidooxidans SG1 | 1.5-2.5 | 0.5-5.0 | 35 | 4-40 |
| Acidithiobacillus caldus | 2.0-2.5 | 1.0-3.5 | 45 | 32-52 |
| Acidithiomicrobium SAR | 1.7-2.5 | 1.0-3.5 | 50 | 40-55 |
| Acidimicrobium ferrooxidans | 1.7-2.5 | 1.0-3.5 | 50 | 40-55 |
| Sulfobacillus thermosulfidooxidans | 1.7-2.4 | 1.0-3.0 | 50 | 28-60 |
| Sulfobacillus MAD | 2.0-3.0 | 1.0-4.0 | 50 | 38-55 |
| ARCHAEA |  |  |  |  |
| Ferroplasma acidiphilum | 1.7 | 1.3-2.2 | 37 | 15-45 |
| Sulfolobus metallicus | 1.7-2.0 | 1.0-5.5 | 70 | 65-78 |
| Metallosphaera sedula | 2.0 | 1.0-4.5 | 75 | 50-80 |
| Metallosphaera hakonensis |  | Closely related to Metallosphaera sedula |  |  |

The inoculation step 36D is followed by the leach step 36E. A low nitrate or nitrite raffinate solution 58 is applied to the heap 24 and is collected in the drainage at the bottom of the heap 24 as a low nitrate or nitrite pregnant leach solution 2 (PLS2) 60 which contains a high copper concentration and other cationic and anionic species from the leached ore.

During the leach step 36E, forced aeration 40 is applied from the bottom of the heap 24 at the rate of 0-0.05 $Nm^3/hr \cdot t$.

The PLS2 60 is collected in a PLS 2 pond 62 which feeds the solvent extraction (SX2) plant 48B where copper is concentrated to produce an advance electrolyte solution 50 which is treated to recover copper by means of electrowinning in the electrowinning tankhouse 52. The resulting PLS 2 60 stripped of copper and enriched with acid constitutes the low nitrate or nitrite raffinate solution 58 and is collected in a low nitrate or nitrite raffinate pond 64. The raffinate 58 is recycled to the leach step 36E in the heap 24.

In the low nitrate or nitrite raffinate pond 64, fresh water 66 may be added as make-up water in order to compensate for water loss in the heap leach circuit due to moisture in the leached residue ore, spillages, leakages and evaporation. Sulfuric acid 68 is added in order to replace the acid that is consumed by the ore in the leach step 36E.

As leaching proceeds, the copper concentration decreases in the PLS2 solution 60 and the resulting intermediate leach solution (ILS) 70, is routed to an ILS pond 72 where the concentration is normally in the range of 1-5 g/L copper. Besides being used as a contact solution in the agglomeration step 12, the intermediate leach solution 70, from the pond 72, can be pumped to the heap 24 where it can be used as an irrigation leach solution in leach step 36E. The resulting drainage solution from the heap 24 is sent to the PLS2 pond 60 or to the ILS pond 72, depending on the copper concentration. Typically the copper concentration in the PLS 2 is >5 g/L Cu, however this is not limiting. The ILS pond 72 also provides capacity for additional storage in the event of disruption to downstream treatment of the PLS2 solution 60 in the SX step 48.

The ore agglomeration step 12 ensures that the solution in contact with the ore 14 achieves high oxidation potentials of 750-1200 mV versus standard hydrogen electrode (SHE) resulting in the rapid oxidation of copper sulfide minerals and iron sulfide minerals including pyrite once the ore is stacked 36A in a heap 24 and during the cure step 36B. The high solution oxidation potentials achieved (750-1200 mV vs. SHE) increase the sulfide mineral oxidation rate increasing the rate of metal dissolution and reducing the heap leach cycle time compared to conventional heap bioleaching methods for the treatment of base metal ores.

The present invention is particularly suitable for the treatment of ores containing chalcopyrite and secondary copper sulfide minerals (for example enargite, bornite, chalcocite and covellite). The pre-treatment step activates the mineral sulfides prior to the acid leaching step, thereby increasing the rate of metal dissolution compared to conventional acid bioleaching. Copper or other base metals such as nickel and cobalt can be recovered from the pre-treated ore by bioleaching according to the method of the invention.

The tests conducted confirm the oxidation of pyrite occurring with or without aeration. The oxidation of sulfide minerals without aeration is a unique feature of the proven method of the invention resulting in heat generation and increased heap temperatures without the need for high rates of aeration limited by the heap permeability to fluid flow. Process operators can take advantage of the high oxidising environment to reduce the overall air supply to the process thereby simplifying operation and lowering operating costs.

The presence of nitrate or nitrite in copper solutions can have a detrimental effect on the SX plant operation as it degenerates the extractants through nitrification. It is therefore necessary to add a proprietary reagent modifier to the organic phase to prevent excessive reagent degradation.

Pyrite Oxidation Tests

Two flat-bottomed flasks were used to determine pyrite oxidation under bioleach conditions according to the method of the invention, hereinafter referred to as "Nitro-bioleach" and standard bioleach conditions. The composition of the sample used for the test-work is presented in Table 1 below. The sample contained 97% pyrite with minor impurities of sulfates and copper sulfides.

TABLE 1

Pyrite sample composition

| Mineral Mass (%) | Formula | Composition |
|---|---|---|
| Cu Sulphides |  | 0.30 |
| Pyrite | FeS$_2$ | 97.26 |
| Other Sulphides |  | 0.14 |
| Silicates |  | 1.68 |
| Sulphates |  | 0.28 |
| Others | — | 0.35 |
| Total |  | 100.00 |

Procedure:

2×2 L flat-bottomed flasks were filled with 400 mL of chloride raffinate of known chemical composition. Known amounts of sodium nitrate and sulfuric acid were added to the Nitro-bioleach flask. Only acid was added to the standard bioleach flask as presented in the table below. At time T=0, pyrite was added to the mixture which was cautiously mixed and allowed to settle. A 15 ml volume of the solution was immediately taken from both flasks and analysed for Fe(T), $Fe^{2+}$, $H^+$, $SO_4^{2-}$ and Eh respectively. The solution volume taken out was replaced by an equivalent amount of bioleach raffinate. The flask mixture was neither aerated nor agitated during the test period.

TABLE 2

Quantities of reagents used during the test

|  | Nitro-bioleach | Bioleach |
|---|---|---|
| Raffinate type | Bioleach | Bioleach |
| Volume Raffinate (ml) | 400 | 400 |
| Nitrate Sodium Added (g) | 24 | 0 |
| Acid Added (ml) | 48 | 48 |
| Pyrite (g) | 50 | 50 |

TABLE 3

Composition of Bioleach Raffinate

| | CuT (g/l) | Fe(T) (g/l) | Fe+2 (g/l) | H+ (g/l) | CL (g/l) | Density | Nitrate (kg/t) | SO4 (g/l) |
|---|---|---|---|---|---|---|---|---|
| Raffinate Bioleach | 0.56 | 1.21 | 0.52 | 8.2 | 1.5 | 1.10 | 0 | 90 |

The sampling was repeated once a day for the next 4 days that followed. The results, tabulated in Table 3 below, show a slight decrease in Eh, $Fe^{3+}$ and $H^+$ while the Fe(T) and $Fe^{2+}$ both increased for both flask contents once the pyrite was added.

Figure 2:
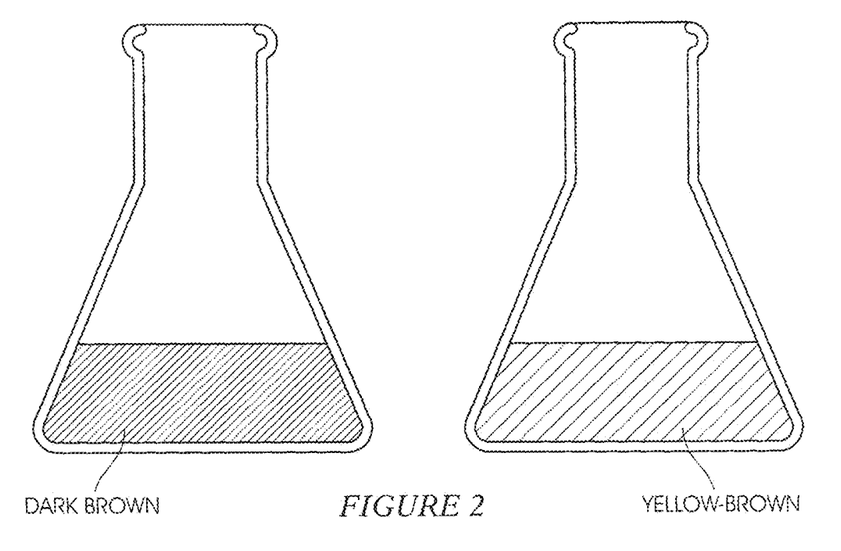
FIG. 2 is illustrates a colour change in a bioleach flask arising during the execution of the method of the invention, a defined period after pyrite addition.

However, after a day, there was a sharp increase in both Fe(T) and $SO_4^{2-}$ content in the flask under Nitro-bioleach conditions while in the flask under standard bioleach conditions, there was only a slight increase in both Fe(T) and Fe3+ respectively. The potential increased from 692 mV to 1017 mV in the Nitro-bioleach flask within the first 10 minutes of nitrate addition. After 15 minutes of adding pyrite, the color of the raffinate in the Nitro-bioleach flask changed from dark brown as presented in FIG. 2 (left) to a clear yellowish brown solution as shown in FIG. 2 (right). The solution potential dropped slightly from 1017 mV during the days that followed and stabilized just above 950 mV until the end of the test. A steady increase in the concentration of Fe(T) was recorded in the days that followed, which existed mainly as $Fe^{3+}$ indicating that the environment was highly oxidizing even in the absence of forced aeration. The acid concentration increased from 147 g/L to 277 g/L and then to a maximum of 308 g/L at the end of the test.

Figure 3:
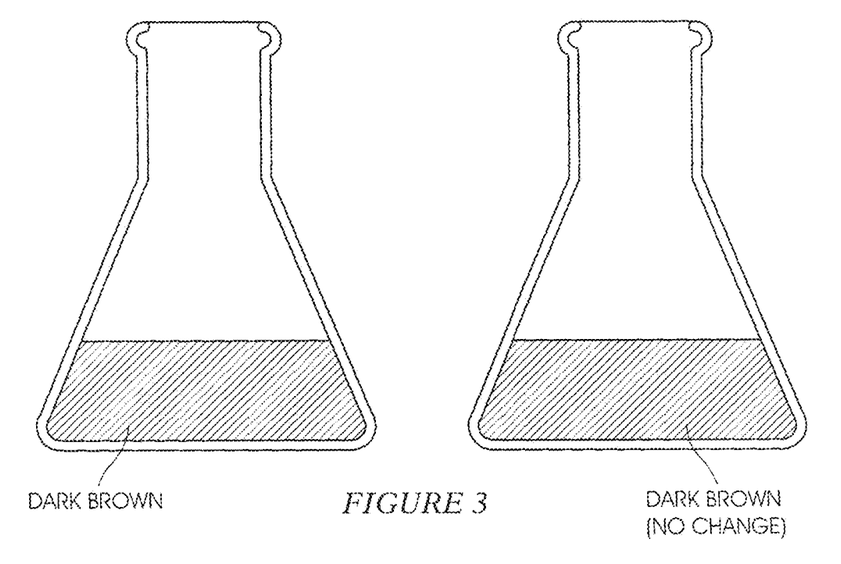
FIG. 3 is illustrates showing a colour change in a standard bioleach flask a defined period after pyrite addition.

In the flask under standard bioleach conditions (FIG. 3), no significant change was observed, and the solution concentration remained almost constant with minor changes in the species, see Table 5. No color change was observed in this flask as compared to the FIG. 2 flask.

TABLE 4

Chemical analysis results in Nitro-bioleach flask

| Time (hrs) | Comments | FeT (g/L) | Fe2+ (g/L) | Fe3+ (g/L) | H2SO4 (g/L) | SO4 (g/L) | Eh (mV) |
|---|---|---|---|---|---|---|---|
|  | Initial solution | 1.6 | 0.28 | 1.3 | 8.6 | 109 | 691.9 |
|  | Initial solution + acid | 1.5 | 0.26 | 1.2 | 147 | 252 | 673.7 |
|  | Initial solution + acid + Nitrate | 1.5 | 0.26 | 1.2 | 147 | 252 | 708.4 |
|  | Initial solution + acid + Nitrate, 10 min Later | 1.4 | 0.07 | 1.3 | 277 | 163 | 1017 |
| 0.0 | Initial solution + acid + Nitrate + Pyrite | 3.5 | 0.22 | 3.3 | 278 | 167 | 977 |
| 2.85 |  | 7.2 | 0 | 7.2 | 283 | 166 | 980 |
| 23.6 |  | 12.2 | 0.00 | 12.2 | 305 | 160 | 969 |
| 50.0 |  | 12.2 | 0 | 12.2 | 305 | 160 | 978 |
| 70.4 |  | 13.0 | 0 | 13.0 | 300 | 159 | 978 |
| 98.1 |  | 14.4 | 0 | 14.4 | 308 | 158 | 976 |

TABLE 5

Chemical analysis results in standard bioleach flask

| Time (hrs) | Comments | FeT (g/L) | Fe2+ (g/L) | Fe3+ (g/L) | H2SO4 (g/L) | SO4 (g/L) | Eh (mV) |
|---|---|---|---|---|---|---|---|
|  | Initial solution | 1.58 | 0.28 | 1.29 | 8.6 | 109.0 | 692 |
|  | Initial solution + acid | 1.51 | 0.26 | 1.25 | 147.0 | 251.9 | 674 |
| 0.0 | Initial solution + acid + Pyrite | 1.51 | 0.26 | 1.25 | 147.0 | 251.9 | 708 |
| 24.5 |  | 1.61 | 0.28 | 1.32 | 151.0 | 255.0 | 696 |
| 50.9 |  | 1.62 | 0.28 | 1.34 | 151.7 | 257.7 | 707 |
| 71.4 |  | 1.73 | 0.52 | 1.21 | 151.3 | 230.2 | 709 |
| 99.1 |  | 1.57 | 0.29 | 1.28 | 146.9 |  | 710 |

Figure 4:
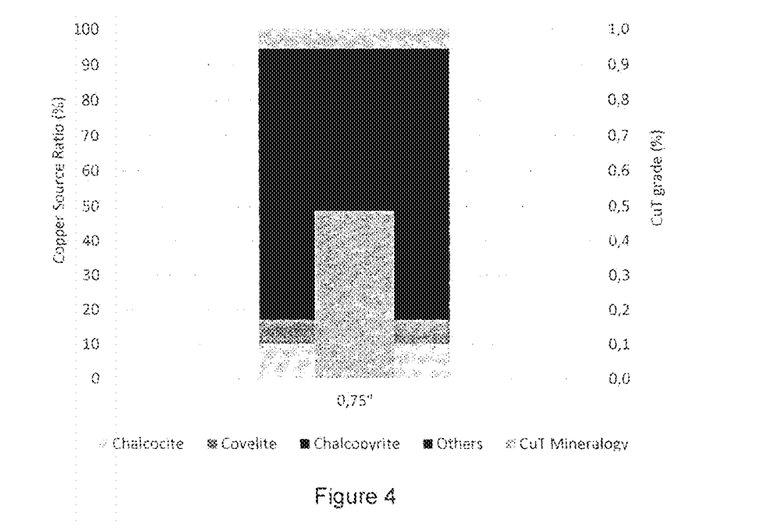
FIG. 4 is a graph showing the ore composition used in a column leach test using the method of invention.

The performance of the method of the invention (herein referred to as the "Nitrobioleach" process) was tested by the applicant on a primary copper sample containing 80% chalcopyrite as the main copper source with a copper grade of 0.49% as presented in FIG. 4.

The sample, received as Run of Mine (ROM), was prepared in order to produce a final sample of $P_{80}$~¾" through a series of crushing and blending steps in order get a representative sample.

The prepared sample was agglomerated with 20 kg/t sodium nitrate (sodium nitrite may be used instead of sodium nitrate) and 12 kg/t sulfuric acid, producing agglomerates with an average moisture content of 8% for the Nitrobioleach process. For the standard bioleach process, similar conditions were used except that no sodium nitrate or nitrite was added—see Table 6.

TABLE 6

Conditions of Ore Agglomeration

|  |  | Nitrobioleach | Bioleach |
|---|---|---|---|
| Particle Size | P80 | 0.75" | 0.75" |
| Acid dosage | kg/t | 12 | 12 |
| Sodium Nitrate or nitrite dosage** | kg/t | 20 | 0 |
| Temperature | ° C. | 25 | 25 |
| Aeration rate | Nm3/hr · t | 0.04 | 0.04 |
| Irrigation rate | L/m2 · hr | 2 | 2 |
| Irrigation Time | hrs/day | 24 | 24 |
| Cure Period | days | 10 | 10 |
| Column Height | m | 1 | 1 |
| Column Diameter | cm | 16 | 16 |

**Nitrate dose: 20 kg/t NaNO₃ added as solid during ore agglomeration or dissolved in known volume of raffinate solution that was used for ore agglomeration. Sodium nitrite may be used instead of sodium nitrate.

TABLE 7

1. Ore agglomeration and irrigation raffinate solution composition

|  | CuT (g/l) | FeT (g/l) | Fe +2 (g/l) | H+ (g/l) | Cl (g/l) | Density | Nitrate or nitrite (kg/t) | SO4 (g/l) |
|---|---|---|---|---|---|---|---|---|
| Solution Raffinate | 0.56 | 1.21 | 0.52 | 8.2 | 2 | 1.26 | 0 | 90 |

The agglomerated ore was loaded into respective 1 m×160 mm ID duplicate columns and allowed to cure for 10 days. Aeration of 0.04 Nm³/hr·t was used during agglomerated ore curing and ore irrigation for both processes. The column tests were completed in duplicate.

Upon the completion of the curing step, a contact solution with a solution composition as presented in Table 7 above was used as irrigation solution for irrigation of ore loaded in the columns. The PLS was analysed for $Cu^{2+}$, Fe(T), $Fe^{2+}$ and acid respectively.

Figure 5:
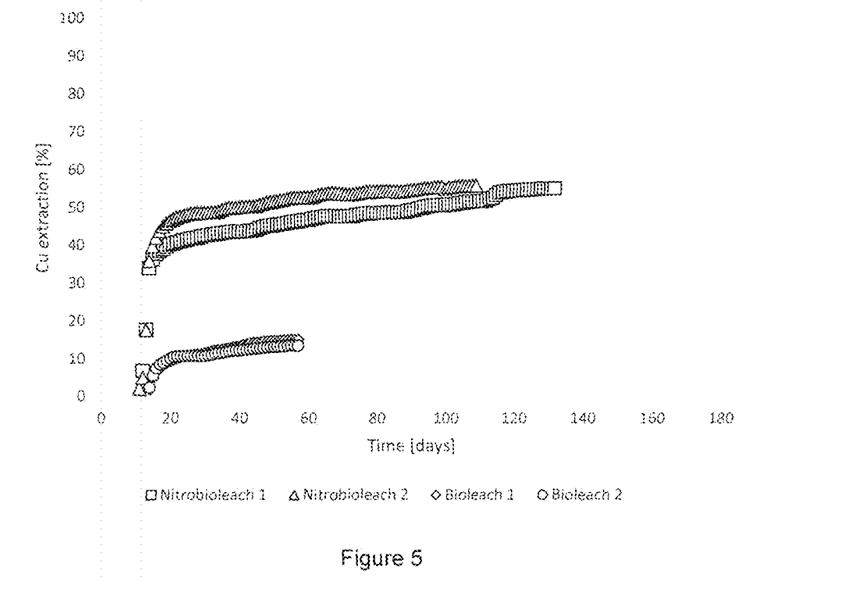
FIG. 5 is a graph showing the copper dissolution achieved for leaching of crushed agglomerated ore in a column using the method of invention compared to a standard bioleach.

A maximum of 50% copper dissolution was achieved in the Nitrobioleach columns compared to 15% copper dissolution in the standard bioleach process for the same period of operation (see FIG. 5).

The results obtained demonstrate that the Nitrobioleach process creates a higher oxidising environment in the heap in the ore agglomeration and cure steps which facilitates the dissolution of metals of interest at a faster rate and thereby reduces the leach cycle time.

The invention claimed is:

1. An oxidative bioleaching process for leaching a base metal from a heap of ore comprising:
   agglomerating ore to form agglomerated ore;
   stacking the agglomerated ore to form a heap;
   curing the agglomerated ore in the heap;
   rinsing the agglomerated ore in the agglomerated heap; and
   inoculating the agglomerated ore in the agglomerated heap; and
   leaching the agglomerated ore in the agglomerated heap;
   wherein, during the agglomerating step, the ore is contacted with an acidified solution and nitrate or nitrite, to create an oxidative environment prior to the inoculating and leaching steps.

2. The oxidative bioleaching process of claim 1, wherein, during the ore agglomeration step, the solution in contact with the ore has oxidation potentials in the range of greater than 750 mV to less than 1250 mV versus SHE (standard hydrogen electrode) thereby to accelerate a leaching rate in the leach step.

3. The oxidative bioleaching process of claim 1, wherein prior to the agglomerating step, the ore is crushed to a crush size in the range of P80 of 6 mm to P80 of 50 mm.

4. The oxidative bioleaching process of claim 1, wherein the nitrate or nitrite is added in solution or as a solid salt to the ore in the agglomerating step in a range of 1-50 kg/t of ore treated.

5. The oxidative bioleaching process of claim 1, wherein the nitrate is selected from one of more of $NaNO_3$, $KNO_3$, and/or $HNO_3$.

6. The oxidative bioleaching process of claim 1, wherein the nitrite is selected from one of more of $NaNO_2$, $KNO_2$, and/or $HNO_2$.

7. The oxidative bioleaching process of claim 1, wherein the acidified solution in contact with the ore during the agglomerating step has a pH lower than pH 3.

8. The oxidative bioleaching process of claim 1, wherein the acid concentration in the acidified solution is in the range of 2-250 g/L.

9. The oxidative bioleaching process of claim 1, wherein concentrated acid is added to the ore during the agglomerating step to supplement the acid in the acidified solution in a range of 1-100 kg/t of ore treated.

10. The oxidative bioleaching process of claim 1, wherein during the agglomerating step, the acidified solution in contact with the ore contains iron, copper and other dissolved cations and anions as leach product species.

11. The oxidative bioleaching process of claim 1, wherein recycled process solution containing nitrate or nitrite is used in the agglomerating step.

12. The oxidative bioleaching process of claim 1, wherein the moisture content of the agglomerated ore is in the range of 3-20% during the agglomeration step.

13. The oxidative bioleaching process of claim 1, further comprising scrubbing nitrous gases (NOx) produced in the agglomerating step by passing the nitrous gases through a raffinate solution in the presence of air or oxygen enriched air.

14. The oxidative bioleaching process of claim 1, wherein during the curing step, the ore is cured for a period of 2-50 days.

15. The oxidative bioleaching process of claim 1, wherein the curing step is carried out without aeration.

16. The oxidative bioleaching process of claim 1, wherein the curing step is carried out with aeration at a rate of up to 0.05 $Nm^3/hr \cdot t$ of ore treated.

17. The oxidative bioleaching process of claim 1, wherein during the rinsing step, a raffinate solution is applied to the heap in the range 0.1-2 $m^3$ solution per ton of ore to displace leached copper and residual nitrate or nitrite salts.

18. The oxidative bioleaching process of claim 17, wherein a resulting high nitrate or nitrite pregnant leach solution from the rinsing step is treated separately by solvent extraction to recover copper.

19. The oxidative bioleaching process of claim 1, wherein the rinsing step is carried out without aeration.

20. The oxidative bioleaching process of claim 1, wherein the rinsing step is carried out with aeration at a rate of up to 0.05 $Nm^3/hr \cdot t$ of ore treated.

* * * * *